United States Patent
Belkin

(10) Patent No.: US 10,817,981 B1
(45) Date of Patent: Oct. 27, 2020

(54) COLOR SAMPLING SELECTION FOR DISPLAYING CONTENT ITEMS USING MACHINE LEARNING

(71) Applicant: Facebook, Inc., Menlo Park, CA (US)

(72) Inventor: Michael Oren Belkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 81 days.

(21) Appl. No.: 16/267,258

(22) Filed: Feb. 4, 2019

(51) Int. Cl.
| | |
|---|---|
| G06T 3/40 | (2006.01) |
| G06K 9/62 | (2006.01) |
| G06K 9/38 | (2006.01) |
| G06N 20/00 | (2019.01) |
| G06F 16/9538 | (2019.01) |
| G06N 3/08 | (2006.01) |

(52) U.S. Cl.
CPC ........ *G06T 3/4015* (2013.01); *G06F 16/9538* (2019.01); *G06K 9/38* (2013.01); *G06K 9/627* (2013.01); *G06N 3/08* (2013.01); *G06N 20/00* (2019.01); *G06T 2207/20081* (2013.01); *G06T 2207/20084* (2013.01)

(58) Field of Classification Search
CPC ......... G06T 3/4015; G06T 2207/20081; G06T 2207/20084; G06F 16/9538; G06N 3/08; G06N 20/00; G06K 9/38; G06K 9/46; G06K 9/627
USPC .................................................. 382/162, 159
See application file for complete search history.

(56) References Cited

U.S. PATENT DOCUMENTS

| | | | |
|---|---|---|---|
| 6,870,544 B2 | 3/2005 | Blanchard et al. | |
| 7,280,118 B2 | 10/2007 | Senn et al. | |
| 8,373,720 B2 | 2/2013 | Voliter et al. | |
| 2007/0257933 A1 | 11/2007 | Klassen et al. | |
| 2008/0062192 A1 | 3/2008 | Voliter et al. | |
| 2010/0020095 A1 | 1/2010 | Reynolds et al. | |
| 2011/0018896 A1 | 1/2011 | Buzyn et al. | |
| 2011/0216966 A1 | 9/2011 | Cok et al. | |
| 2013/0207994 A1 | 8/2013 | Rodeski et al. | |
| 2015/0379743 A1 | 12/2015 | Dorner et al. | |
| 2017/0206677 A1 | 7/2017 | Dziuba | |
| 2017/0337017 A1 | 11/2017 | Watanabe et al. | |

OTHER PUBLICATIONS

Nonomura, et al. (Colors Suitable to presentation Slides), pp. 1-6. (Year: 2016).*

* cited by examiner

*Primary Examiner* — Daniel G Mariam
(74) *Attorney, Agent, or Firm* — Fenwick & West LLP

(57) ABSTRACT

An online system is configured to provide content items to users. The content item includes an image, and is displayed with an interface element colored using an accent color to create a unified look and feel with the displayed image. The accent color is dynamically selected based upon the image, extracted color features of the image, and embeddings associated with the image indicating at least one object depicted in the image. A machine-trained classification model selects the color to be used in displaying the interface element from a quantized set of colors of the image, based upon the extracted color features and the embeddings associated with the image. As such, suitable accent colors can be selected automatically for large numbers of content items, in a flexible manner that can account for the context of the images and the context in which the content item is to be displayed.

20 Claims, 8 Drawing Sheets
(2 of 8 Drawing Sheet(s) Filed in Color)

US 10,817,981 B1

COLOR SAMPLING SELECTION FOR DISPLAYING CONTENT ITEMS USING MACHINE LEARNING

BACKGROUND

This disclosure relates in general to displaying content items to users on an online platform, and in particular, to selection of content item display formats using machine learning.

Users of an online system, such as a social network site, are often presented with a large number of different types of content. For example, the user of a social network site may view a newsfeed containing posts or status updates by other users, various types of content posted or shared by other users (e.g., images, video, links, and/or the like), sponsored content, etc.

Certain types of content may be displayed to the user using at least one image. For example, a content item may include an image such as a thumbnail or preview image that can be displayed to the user. In some cases, the user may interact (e.g., click on) the displayed image or an interface element associated with the displayed image (e.g., a button, arrow, etc.) to perform an action associated with the content item. For example, the user may click on the image to activate a link to a page corresponding to the content item, play a video, scroll to a next image associated with the content item, and/or the like.

Different types of formatting may be used when displaying content items, allowing the user to more easily differentiate between certain types of content items, to draw the user's eyes to certain types of content items, or to allow for different types of functionality associated with the content items. For example, certain types of items may be displayed with interface elements with the image associated with the content item (e.g., a border surrounding the image, a block bordering the image, a button near the image, etc.) having an accent color based upon the colors of the image. In order to give the displayed content item a more eye-catching look and feel, or to indicate that the interface elements are associated with the content item, it may be desirable to select a color for the interface elements or as an accent color that complements or contrasts with the image associated with the content item.

SUMMARY

To improve the appearance of content items displayed to users, an online system may display a content item with an accent color. For example, the content item may include an image to be displayed, and the accent color may correspond to an accompanying interface element such as a button or a color block. The accent color is automatically and dynamically selected such that it complements or contrasts with the image associated with the content item, in order to give the displayed content item a more unified look and feel. In addition, through the use of machine learning, suitable accent colors can be automatically selected for large numbers of content items in a flexible manner that can account for the context of the images and the context in which the content item is to be displayed.

In some embodiments, the online system receives a content item to be provided to a user of the online system, and identifies an image associated with the content item. In addition, the online system determines that the content item is to be displayed with an interface element in proximity to the image. The online system may select a color to be used in displaying the interface element, by quantizing the image into a quantized image associated with a quantized set of colors, and, for each of a plurality of colors of the quantized set of colors, extracting one or more color features based upon the color, wherein the one or more features comprise at least an indication of an amount of coverage of the color within the quantized image and at least one component value of the color. The online system further uses a neural network model to generate at least one embedding describing the image (e.g., indicating features or objects depicted in the image), and a machine-trained classification model to select the color to be used in displaying the interface element from the quantized set of colors, based upon the one or more color features of the plurality of colors and the at least one embedding associated with the image. The online system may then provide the content item for display to the user of the online system, wherein the displayed content item includes at least the image associated with the content item and the interface element displayed in proximity to the image, the interface element displayed in the selected color determined by the machine-trained classification model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
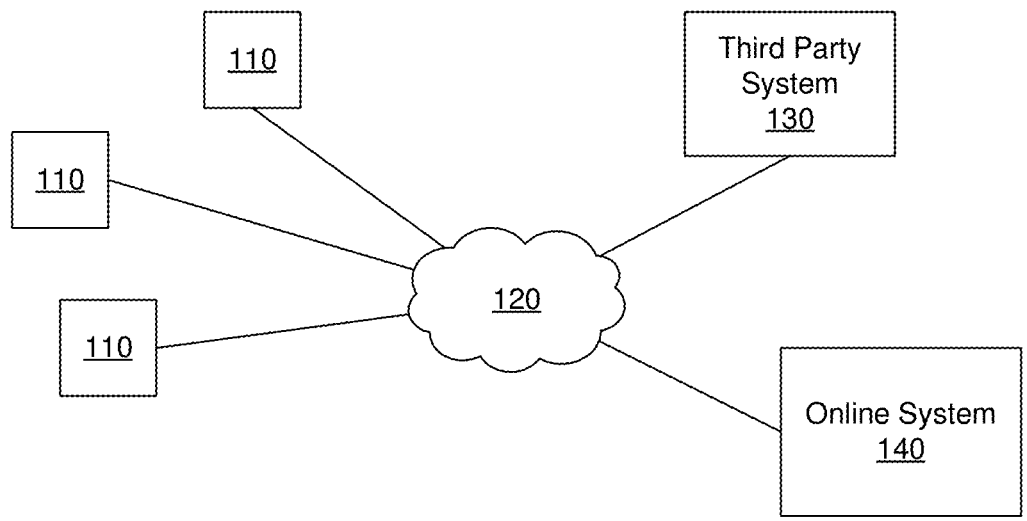
FIG. 1 is a block diagram of a system environment for an online system, in accordance with some embodiments.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
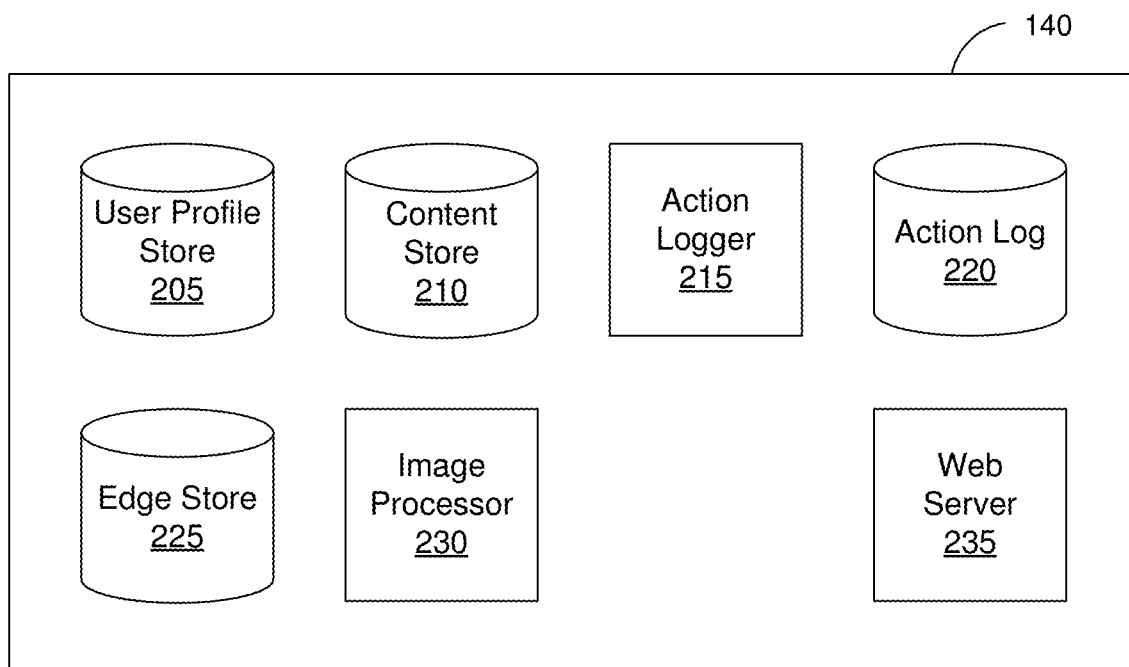
FIG. 2 is a block diagram of an architecture of the online system, in accordance with some embodiments.

FIG. 2 is a block diagram of an architecture of the online system 140. The online system 140 shown in FIG. 2 includes a user profile store 205, a content store 210, an action logger 215, an action log 220, an edge store 225, an image processor 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 may be associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Each user or object can be represented as a node in the social network and the nodes are connected to each other via edges. In one embodiment, the nodes and edges form a complex social network of connections indicating how users and/or objects are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The image processor 230 is configured to format and display content items (e.g., content stored in the content store 210) to a user of the online system 140. For example, as the user 140 views various webpages on the online system 140, the user may be presented with different types of content items. These may include posts or status updates by other users of the online system, content shared by other users (e.g., images, video, links to other online systems or webpages), sponsored advertisement content, and/or the like. For example, the content items may be displayed to the user as part of a social network newsfeed. In some embodiments, content items displayed to the user may be selected based upon one or more affinities associated with the user.

In some embodiments, certain types of content items are associated with an image (e.g., a preview image). In order to increase a visibility of the content item or to visually differentiate the content item from other types of content items, the image processor 230 may format how the content item is displayed, such as by adding interface elements having an accent color to be displayed in conjunction with the image associated with the content item (e.g., a border surrounding the image of the content item, a color block bordering the image, etc.). In addition, the interface elements may allow the user to interact with the content item. For example, a content item displayed to the user may comprise an image of a product and a button labelled "Learn More" that borders the image that the user may click on to learn more about the product displayed in the image. In some embodiments, in order to give the displayed content item a more unified look and feel, the image processor 230 selects the accent color for the interface element based upon the image associated with the content item. In some embodiments, the interface element may change color when displayed to the user (e.g., from a default color to the selected accent color), in order to draw the user's attention to the interface element while also appearing unified and related to the displayed image. As used herein, an "accent color" may refer to any color selected for an interface element to be displayed in conjunction of an image, as part of presenting a content item to a viewing user.

In some cases, the accent color to be associated with an image (e.g., via user interface) may be manually selected by a user (e.g., a designer) via a user interface. For example, the image processor 230, upon receiving a content item having an associated image, may present the designer with a user interface, whereupon the designer may input a desired accent color upon viewing the image associated with the content item. However, manually selecting accent colors may be tedious and time consuming, and impractical on a large scale, as the designer would need to manually select accent colors for each individual image.

In some embodiments, the image processor 230 maintains one or more sets of rules to automatically select an accent color for a received image. Each rule set may contain a plurality of rules, each rule specifying at least one characteristic of a color that may be selected. For example, a rule of a rule set may specify that in order to be selected as an accent color for the image, a color of the image (or a color of a quantized color set corresponding to the image) must have at least a threshold amount of coverage within the image, have at least a threshold amount of colorfulness, not have a hue falling within a predetermined range of hues, have at least a threshold amount of contrast with white text, and/or the like. In some embodiments, a rule set may be used to identify a color that complements a color of the image to be used as an accent color. In some embodiments, the image processor 230 maintains a plurality of rule sets, each associated with a priority level. For example, if the image processor 230 is unable to select an accent color for an image using a rule set having a highest priority, the image processor 230 may attempt to select an accent color using a different rule set having a next highest priority, and so on until a suitable color is identified. Examples of rules-based approaches for automatically selecting accent color to be associated with an image are described in U.S. patent application Ser. No. 15/787,537, titled "Color Sampling for Displaying Content Items," filed on Oct. 18, 2017, which is hereby incorporated by reference in its entirety.

While the use of rule sets may allow for the image processor 230 to be able to automatically select accent colors for a received image, this type of selection may exhibit reduced flexibility as the rules sets will typically impose hard limits on what types of colors can be selected as accent colors. For example, while a designer may typically want to select accent colors that have at least a threshold amount of colorfulness, there may be certain cases where an accent color having less than the threshold amount of colorfulness is desirable. In addition, predefined rule sets may not always be able to account for the context of a received image. For example, colors with certain hues (e.g., brown or orange hues) may be undesirable for use as accent colors in certain contexts (e.g., where the color corresponds to skin tones depicted in the image), but be acceptable in other contexts (e.g., when the color corresponds to rocks or landscape features depicted in the image).

In other embodiments, the image processor 230 uses a machine-trained classification model to automatically select accent colors to be associated with an image and content item. The classification model is trained using machine-learning techniques, and is configured to receive image data associated with a content item, and return at least one selected accent color based upon the received image data. Using machine learning, the classification model allows for suitable accent colors to be selected automatically for large numbers of content items, in a flexible manner that can account for the context of the images and the context in which the content item is to be displayed.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Content Items with Accent Colors

Figure 3A:
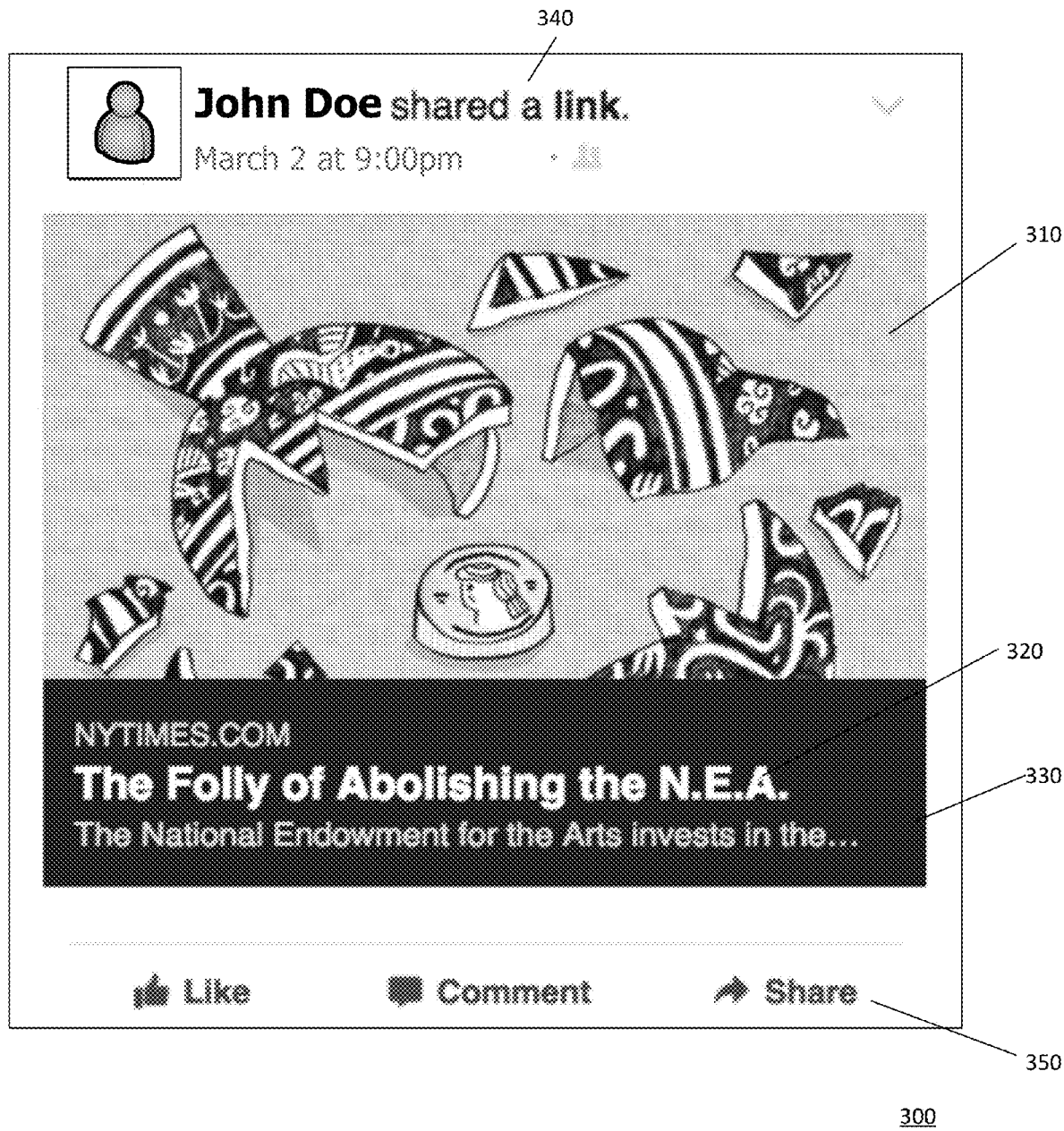
FIG. 3A illustrates an example of a content item that may be displayed to a user of an online system.

FIG. 3A illustrates an example of a content item 300 that may be displayed to a user of an online system. In some embodiments, the content item 300 may be integrated as part of a newsfeed displayed to the user of the online system. For example, where the online system corresponds to a social networking platform, the content item 300 may correspond to a content item shared or posted by another user, an advertisement displayed to the user, and/or the like. The content item 300 may comprise an image, video, file, link to another online system or website, and/or the like. The content item 300 may be stored in the content store 210 illustrated in FIG. 2.

As discussed above, in some embodiments the content item 300 is associated with an image 310 that is displayed to the user. The image 310 may be any image associated with the content item 300. For example, if the content item 300 is an image, the image 310 may correspond to the image or a manipulated version of the image (e.g., a down-sized version of the image). If the content item 300 is a file, the image 310 may correspond to an image of an icon representative of the file, or an image stored within the file. If the content item 300 corresponds to a video, the image 310 may correspond to a screenshot of the video. If the content item 300 is a link to another online system or website, the image 310 may be an image associated with the other online system or website pointed to by the link (e.g., an image displayed on the website). In some embodiments, the user may be able to interact with the content item 300 through the displayed image 310 (e.g., clicking on the image 310 to open the file, play the video, or access the other online system or website corresponding to the content item 300) or other user interface elements displayed in conjunction with the image 310 (e.g., text 320, color block 330, buttons 350, etc.).

The content item 300 may also be associated with text 320. The text 320 may correspond to a name or title for the content item (e.g., a file or image name, a title for a video, a title of another online system or website that the content item 300 links to, and/or the like). In some embodiments, the text 320 comprises multiple pieces of text associated with the content item 300. For example, in FIG. 3A where the content item 300 is a link to an article on a website, the text 320 comprises a domain name of the linked website, a title of the article to which the link points, and a subtitle of the article.

In some embodiments, certain content items may be displayed with interface elements having a selected accent color, in order to differentiate the content item from other types of content displayed to the user. The use of accent colors may function to draw the user's eyes to the content item 300, or to indicate to the user that the content item 300 may be interacted with. In some embodiments, such as that illustrated in FIG. 3A, the interface element may comprise a color block 340 of a selected accent color bordering the image 310 and surrounding the text 320. In other embodiments (not shown), the interface elements may comprise a border around the image 310 and/or the text 320 having the selected accent color. It is understood that in other embodiments, other types of interface elements, such as a button, a banner, or an icon, may be displayed.

In some embodiments, the content item 300 may further be associated with an identifier 340 indicating a source associated with the content item (e.g., an identity of another user who shared the content item 300). The content item 300 may also be associated with one or more additional user interface elements 350 (e.g., buttons or icons) that allow the user to perform additional actions relating to the content item 300 (e.g., "like" the content item 300, comment on the content item 300, share the content item 300 with other users, etc.). In some embodiments, the identifier 340 or the user interface elements 350 may be omitted when displaying the content item 300.

In some embodiments, the content item 300 is displayed in conjunction with different interface elements, some having the accent color (e.g., color block 330), and some not (e.g., elements 350). The types of interface elements displayed and whether or not they are colored with the accent color may be based upon the type of content item 300 or the type of interface element. For example, different types of content items 300 may be displayed with different interface elements arranged in different configurations. In addition, certain types of interface elements may be displayed with the accent color, while other types of interface elements are not displayed using the accent color.

Figure 3B:
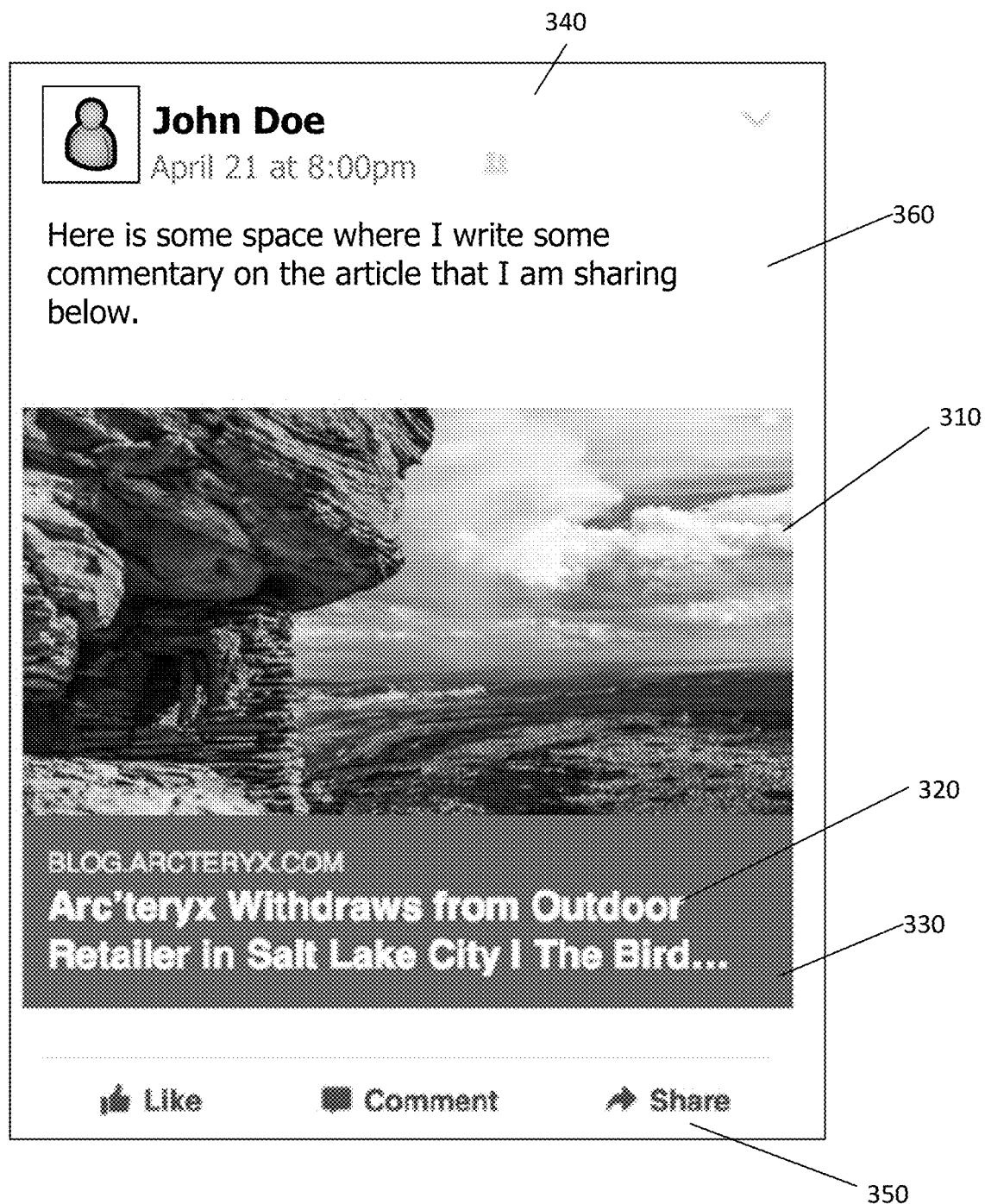
FIG. 3B illustrates another example of a content item that may be displayed to a user of an online system.

FIG. 3B illustrates another example of a content item 300. In some embodiments, the content item 300 may be associated with additional text or annotations 360. For example, the additional text 360 may correspond to comments from another user who shared the content item 300 (e.g., corresponding to the identifier 340) relating to the content item 300.

In some embodiments, the accent color selected for a content item 300 may be based upon dominant colors within the image 310 (e.g., colors having a certain amount of coverage within the image). In other embodiments, the accent color may be selected to complement or contrast with the colors of the image (e.g., correspond to a complement of a color of the image). In some embodiments, whether the accent color is selected as based upon a dominant color of the image or to complement the image may be based upon the colors present in the image, a context of the image, and/or the like.

Accent Colors Selection Using Machine Learning

In some embodiments, the accent color associated with the content item 300 is dynamically selected by the image processor 230 using a machine-trained classification model, based upon the colors present in the image 310. This allows for the image 310 and its associated interface elements to have a visually consistent feel, improving the appearance of the content item 300 to the user.

Figure 4:
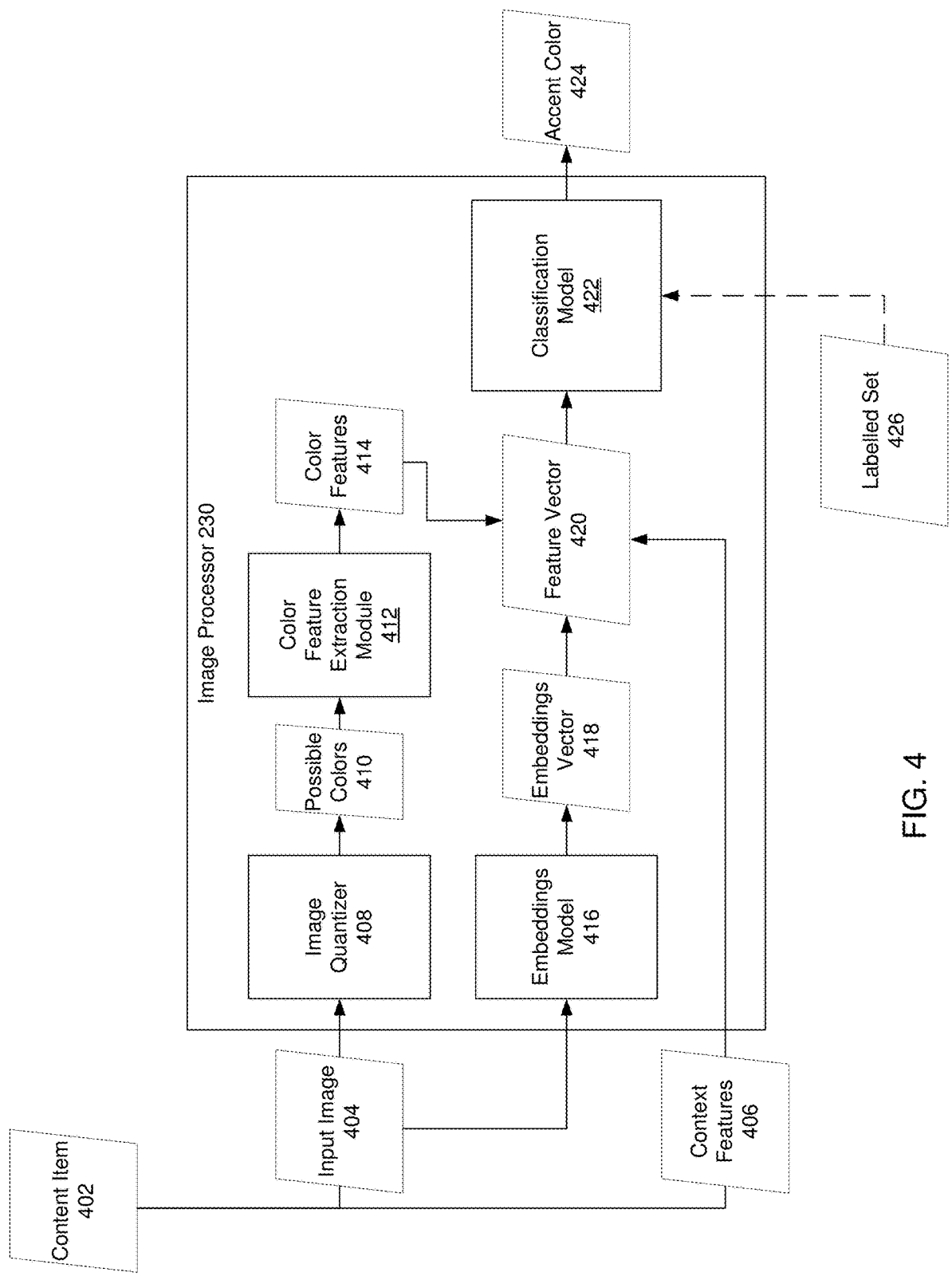
FIG. 4 illustrates a diagram of how the color selection model is used to select accent colors, in accordance with some embodiments.

FIG. 4 illustrates a diagram of how the image processor 230 is used to select accent colors, in accordance with some embodiments. The image processor 230 is configured to receive information corresponding to a content item 402 to be displayed, and to select an accent color 424 to be used in displaying the content item based upon an image 404 (also referred to as an "input image") associated with the content item. For example, the selected accent color 424 may be used to color an interface element displayed in conjunction with the input image 404 of the content item 402.

Information corresponding to the content item 402 used by the image processor 230 to select the accent color 424 includes the input image 404 associated with the content item 402. In addition, the content item 402 may be associated with context features 406 that may be used by the image processor 230 in selecting the accent color 424.

To select the accent color 424, the image processor 230 extracts a plurality of features associated with the content item 402 (e.g., from the input image 404 and the context features 406), and passes the extracted features into a machine-trained classification model 422, which selects an accent color based upon the extracted features. In some embodiments, the classification model 422 may be implemented as a gradient boosted decision tree. In other embodiments, other types of machine-trained models may be used, such as other types of decision trees, a neural network model, etc. In some embodiments, the image processor 230 comprises a receiver that receives the input image 404. In other embodiments, the image processor 230 receives the content item 402, and extracts or identifies the input image 404 associated with the received content item.

The image processor 230 further receives context features 406 associated with the content item 402, which relate to how the content item 402 is to be displayed. The context features 406 may indicate a type of the content item 402 (e.g., a link, a video, etc.), how the content item 402 is to be displayed (e.g., as a newsfeed post, as a sponsored post, etc.), a type of interface element the accent color is to be used for (e.g., a button, a banner, a navigation bar, etc.), a platform or social network the content item is to be displayed on, a type of interface on which the content item is to be displayed to the user (e.g., mobile or desktop interface), one or more characteristics of the interface currently being displayed to the viewing user (e.g., background color of the interface), etc. In some embodiments where the image processor 230 receives the content item 402, the image processor 230 may determine the context features 406 from the received content item 402. In other embodiments, the image processor 230 receives the image 404 and the context features 406 corresponding to the content item separately.

The image processor 230 comprises an image quantization module 408 (hereinafter also referred to as the "image quantizer" 408). The image quantizer 408 receives the input image 404, and quantizes the image into a set of possible colors 410. In some embodiments, the possible color set 410 may correspond to a predetermined number of colors (e.g., set of 32 or 64 colors). The image quantizer 408 may determine a quantized set of colors that most accurately reflect the received input image 404. Quantizing the image into a predetermined number of colors may serve to limit the set of colors from which the accent color can be selected, as well as facilitate the determination of certain features associated with the input image 404. For example, by quantizing the input image 404 into a limited set of colors, a coverage of each color of the set of colors in the quantized image may be determined and used as part of the color selection process.

In some embodiments, the image processor 230 further comprises a color filterer (not shown) that may cause one or more colors from the quantized color set produced by the image quantizer 408 to be excluded from the possible color set 410. For example, certain colors (e.g., certain brown or orange shades) may be predetermined to be not be suitable for use as accent colors, and as such are automatically excluded using the color filterer.

In some embodiments, the possible color set 410 may, in addition to including colors present in the quantized input image 404, further include colors that complement those of the quantized input image 404. For example, in some embodiments the accent color for the input image 404 may be selected from the combined set of colors corresponding to the quantized set of colors (minus any filtered out by the color filterer) and their respective complements.

The image processor 230 further comprises a color feature extraction module 412 configured to extract color features 414 corresponding the possible color set 410 corresponding to the input image 404. As used herein, a feature may correspond to any characteristic or attribute of the input image 404, a color of the possible color set 410, and/or the like. The color feature extraction module 412 may extract features corresponding to each color of the quantized color set (e.g., color features). For example, the color feature extraction module 412 may extract, for each color of the possible color set 410, features that may include a prominence of the color within the quantized input image (e.g., an amount of coverage, such as a number of pixels within the quantized input image, of the color), components of the color (e.g., hue, saturation, brightness, individual RGB values, etc.), an aggregation of one or more attributes of the color such as a colorfulness of the color (e.g., an attribute of the color indicating a degree to which the color appears more or less chromatic to the user), whether the color contrasts with certain colors used for displaying text, and/or the like.

The image processor 230 further comprises an embeddings model 416 configured to extract a set of embeddings from the input image 404. As used herein, an "embedding" refers to descriptive data associated with a received image, which may indicate types of objects or entities depicted in the image. For example, the embeddings for a particular image may indicate that the image contains depicts certain types of objects (e.g., a person, a dog, a car, etc.), descriptive details associated with the depicted objects (e.g., whether a car depicted in the image is a BMV, whether a dog depicted in the image is brown, etc.), and/or the like. In some embodiments, an embedding of an image may be expressed as a vector (e.g., a float vector), illustrated in FIG. 4 as embeddings vector 418. The embeddings vector 418 may comprise a plurality of float values that describe the content of the image 402.

Figure 5:
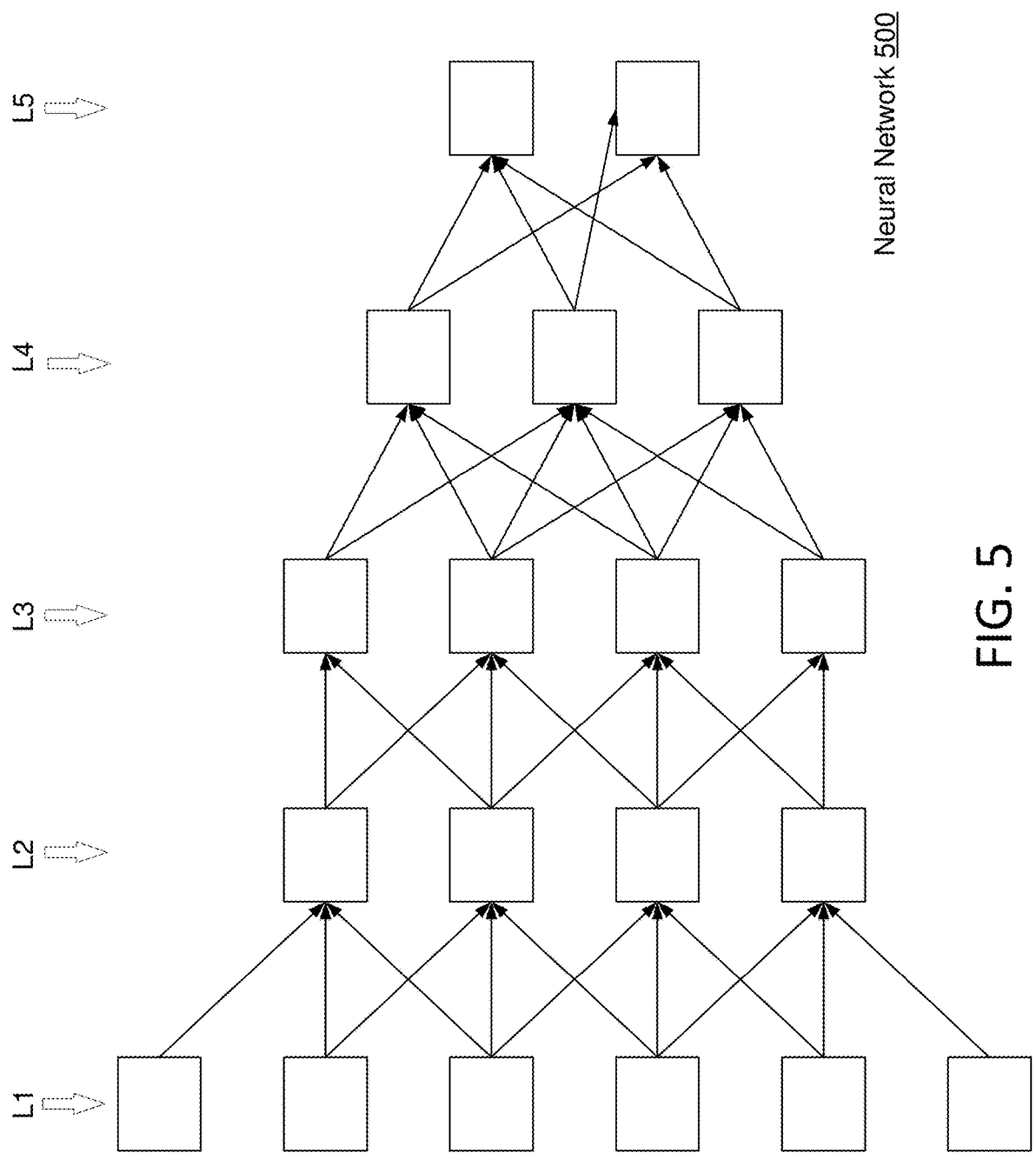
FIG. 5 illustrates an example neural network model that may be used to generate embeddings from a received image, in accordance with some embodiments.

In some embodiments, the embeddings model 416 is implemented as a neural network model. FIG. 5 illustrates an example neural network model that may be used to generate embeddings from a received image, in accordance with some embodiments. The neural network 500 comprises a plurality of layers (e.g., layers L1 through L5), each of the layers comprising one or more nodes. Each node has an input and an output, and is associated with a set of instructions corresponding to the computation performed by the node. The set of instructions corresponding to the nodes of the neural network may be executed by one or more computer processors. The neural network 500 may also be referred to as a deep neural network.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

The first layer of the neural network 500 (e.g., layer L1 as illustrated in FIG. 5) may be referred to as the input layer, while the last layer (e.g., layer L5) is referred to the output layer. The remaining layers between the input and output layers (e.g., layers L2, L3, L4) are hidden layers. Accordingly, nodes of the input layer are input nodes, nodes of the output layer are output nodes, and nodes of the hidden layers are hidden nodes. Nodes of a layer may provide input to another layer and may receive input from another layer. For example, nodes of each hidden layer are associated with two layers (a previous layer and a next layer). The hidden layer receives the output of the previous layer as input and provides the output generated by the hidden layer as input to the next layer. For example, nodes of hidden layer L3 receive input from the previous layer L2 and provide input to the next layer L4.

The layers of the neural network 500 are configured to identify embeddings within the received image. In some embodiments, the layers of the neural network 500 perform classification on the received image (e.g., determine a probability that the image depicts a particular type of object). For example, the output of the last hidden layer of the neural network 500 (e.g., the last layer before the output layer, illustrated in FIG. 5 as layer L4) may be used to indicate the embeddings associated with the received image. The embeddings of the image may be expressed as a set of vectors (e.g., a 256-bit vector) indicating features of the image to form the embeddings vector 418. On the other hand, the output layer of the neural network 500 may output one or more scores associated with the embeddings. For example, each of the output scores may correspond to a probability that a particular type of object is depicted in the received image.

In some embodiments, the network characteristics of the neural network (e.g., weights between nodes) may be updated using machine learning techniques. For example, the neural network 500 may be provided with a training set comprising a set of images and corresponding information indicating features of the images. The determined semantic features of the images may be compared to the actual features associated with each image, whereupon the comparison is used to update the network characteristics of the neural network. For example, in some embodiments, the neural network may be trained to more easily recognize specific types of features in received images.

In some embodiments, the image processor 230 combines the color features 414, the embeddings vector 418, and the context features 406 into a feature vector 420. The feature vector 420 will thus reflect the features of the colors of the possible color set 410 that can be selected as accent colors, the descriptive data and context of the image 402 (based on the embeddings of the image 402), and the context in which the content item 402 is to be displayed. The feature vector 420 is received by a classification model 422, which uses the received feature vector 420 to select the accent color 424 to be used when displaying the content item 402.

Using the feature vector 420, the classification model 422 is able to select the accent color 424 based upon the features corresponding to each color of the possible color set 410, the embeddings of the input image 404, and the context of the content item 402. Having access to various features corresponding to each color of the possible color set 410, the classification model 422 can be trained to weigh each of the features (or combinations of features) and determine how each feature contributes to the selection of accent colors. For example, in some cases, colors that are more prominent within the image may be more likely to be selected for use as accent colors. In some cases, colors having component values within certain ranges (e.g., hues corresponding to brown or orange shades) may be more or less likely to be selected.

Furthermore, because the feature vector 420 is formed using the embeddings vector 418 corresponding to the input image 404 (as determined by the embeddings model 416), the classification model 422 can take into account a context of the input image 404, based upon the type of objects that are depicted within the input image 404 as determined by the received embeddings. In some embodiments, the context of the input image 404 may influence what types of colors of the possible color set 410 may be selected as the accent color 424. For example, in some cases, colors having certain hues may be less likely to be selected as accent colors if they are associated with certain types of objects present in the image 402, as determined using the embeddings vector 418 (e.g., a color having a hue within a range associated with brown or orange may be less likely to be selected if the color corresponds to the skin tone of a human depicted within the image, but is not otherwise impacted if the image only depicts non-human objects).

In addition, because the feature vector 420 will reflect context features 406 associated with the content item 402, the classification model 422 is able to select the accent color 424 based upon how the content item 402 is to be displayed. Certain colors may be more suitable for use for accent colors for certain types of content items or interface elements. For example, different accent colors may be selected for a color block bordering an image that contains no text, and a button displayed proximate to but not directly bordering the image that contains text. In some embodiments, different platforms (e.g., social networks) that the content item may be displayed on may have different color schemes, which may influence the choice of accent color to be selected for the content item.

Because in some embodiments the context features 406 may include features of the interface to be displayed to the user, the image processor 230 may be used to select accent colors for a content item on the fly or in real time. For example, in some embodiments, the content item 402 is intended to be displayed on a news feed of a user. The news feed by default may have certain visual attributes (e.g., a white background). However, in some embodiments, a user may be able to change the visual attributes of their news feed (e.g., from a white background to a beige background). As such, the accent color to be used for each content item may be determined on the fly based upon current attributes of the interface to be displayed to the user. In other embodiments, the image processor 230 may be used to pre-select a number of accent colors for a particular content item corresponding to a number of different combinations of user settings (e.g., one or more most common combinations of settings).

As such, the classification model 422 receives the feature vector 420, which reflects the features extracted from the input image 404 (color features 414 and embeddings vector 418) as well as the context features 406 of the content item 402, and generates information indicating at least one color to be used as an accent color for the content item associated with the input image 404. This allows for the classification model 422 to, when selecting the accent color 424, take into account the features of each color of the possible color set 410, the context of the image 402, as well as the context of how the content item 402 is to be displayed. In some embodiments, the classification model 422 may receive the color features 414, embeddings vector 418, and/or the context features 406 separately, instead of together as the feature vector 420.

In some embodiments, the classification model 422 functions as a binary classifier and selects a color from the possible color set 410. For example, for a possible color set 410 containing 64 colors, the classification model 422 may designate one color of the 64 colors as the selected accent color 424, and the remaining 63 colors of the quantized color set as not being selected. In some embodiments, the classification model 422 may output a binary string, each bit corresponding to a color of the possible color set 410, and indicating whether the color has been selected as the accent color 424 (e.g., "1" value) or not (e.g., "0" value).

In other embodiments, the classification model 422 may be a regression model. For example, the classification model 422 may determine for each color of at least a portion of the colors of the possible color set 410, a score based upon the received inputs (e.g., color features 414, embeddings vector 418, and context feature 412). The score may indicate a suitability of the color for use as an accent color for the content item, or a probability that a human designer would, if presented with the content item, select the color for use as an accent color. The accent color 424 output by the classification model 422 may correspond to the color of the possible color set 410 having the highest score, or a listing of one or more colors of the possible color set 410 and their respective scores.

In some cases, it may be more desirable to have an accent color for a content item that contrasts with the input image 404 instead of one that appears unified with the input image 404. As such, in some embodiments, the classification model 422 may select an accent color 424 that is a complement of a color of the quantized image. Thus, the classification model 422 selects the accent color 424 from a pool of colors up to twice the size of the colors of the quantized image 402 (e.g., 128 colors corresponding to the 64 colors of the quantized color set and their complements).

By receiving feature data associated with the colors of the possible color set 410, embeddings of the image 402, and context of which the content item is to be displayed, the classification model 422 is thus able to select accent colors for larger numbers of content items in a flexible manner that takes into account a context of the input images (e.g., what types of objects are depicted in the image) as well as a context of the content items to be displayed.

While FIG. 4 illustrates certain components as being implemented as part of the image processor 230, it is understood that in other embodiments, the image processor 230 may contain additional or fewer components than those illustrated herein. For example, in some embodiments, the classification model 422 may select an accent color for an input image 404 based upon extracted features and embeddings of the input image 404, but without additional context features 406. In addition, in some embodiments, one or more of illustrated components of the image processor 230 may be implemented as part of other components in communication with the image processor 230.

Model Training

Before the classification model 422 can be used to select accent colors 424 for content items having associated input images 402, the classification model 422 must first be trained. In some embodiments, training is performed so that the classification model 422 is able to emulate what would a human designer would pick if tasked with selecting an accent color for the content item, but it receives as input features specific to a machine learning model so it can improve upon human selection and make the selection in a different manner. For example, instead of relying on subjective intuition, the trained model is able to analyze various extracted features of the input image and the colors contained within the image, as well as a context of the image, in order to objectively select at least one color for use as an accent color.

In order to be able to select appropriate accent colors for received images, the image processor 230 trains the classification model 422 using a labelled set 426. The labelled set 426 may comprise a set of input images 402 for which one or more users (e.g., designers) have already manually selected accent colors for, and corresponding labels. The labels indicate, for each of the input images 404, the accent color 424 that was selected for the image by the designer. In some embodiments, the labelled set further comprises context features 406 corresponding to each of the input images 402, relating to how the input images 404 are to be displayed to the user. In some embodiments, the labelled set 426 comprises feature vectors 420 (which indicate the color features, embeddings vector, and context features for a content item), with each feature vector having a corresponding label indicating the selected accent color.

In some embodiments, the labels for each item of the labelled set 426 may comprise a plurality of positive or negative indications for a plurality of colors. For example, where the input image 404 is quantized into a set of N (e.g., 64) colors, the corresponding label may comprise one positive indication corresponding to the color selected by the designer, and N−1 (e.g., 63) negative indications corresponding to colors of the quantized color set that were not selected as an accent color. In some embodiments, the label may comprise a weight or score for each of a plurality of colors assigned by a designer, indicating a suitability of each of the colors as an accent color for the content item corresponding to the input image 404.

The classification model 422 may be trained by using the classification model 422 to process the input images 404 of the labelled set (e.g., using an initial or default set of weights). For example, the classification model 422 may receive, information corresponding to content item of the labelled set (e.g., the feature vector for the content item, or the input image 404, context features 406, color features 414, and embedding vector 418), to select an accent color 424 for the content item.

The selected accent colors 424 are compared with the labels indicated for each item of the labelled set 426, to determine if the classification model 422 was able select accent colors 414 consistent with those selected by the designers as indicated by the labelled set 426. The classification model 422 may then update its weight values based upon the results of the comparison. In some embodiments, this process may be repeated over a plurality of iterations, or with additional labelled sets.

Feedback Mechanisms

In some embodiments, after the classification model 422 has been trained, additional feedback may be provided as the model is used to selected accent colors for content items to be displayed, in order to further train and refine the model. As accent colors for content items are selected and displayed to various users, some of the users may be designers designated as able to provide feedback on the quality of the accent color selections.

In some embodiments, if a particular user viewing a content item comprising an image displayed in conjunction with one or more interface elements having a selected accent color is a designer, the user may be presented with or have access to additional interface elements usable to provide feedback regarding the accent color selected for the content item. For example, the user may have an account on the online system indicating that they are a designer. The online system, when displaying the content item to the user, may be able to automatically determine that the user is a designer based upon previously submitted login information, or may prompt the user to input login information to indicate that they are a designer qualified to provide feedback regarding accent color selection.

In some embodiments, if the user agrees that the selected accent color is suitable for the content item and its associated image, the user may indicate, via the interface, a positive indication for the color. On the other hand, if the user believes the selected accent color to be unsuitable, the user may provide a negative indication. In some embodiments, if the user provides a negative indication, the user may be presented with a set of colors (e.g., the quantized set of colors corresponding to the image), whereupon the user may select a particular color that the user believes should be used as the accent color for the content item. In response, the color selection model 235 may generate a set of indications to be used for training the classification model 422 (e.g., a positive indication corresponding to the selected color, and negative indications for the remaining unselected colors of the set of colors).

In some embodiments, the feedback indications received from viewing users may be used to update the classification model 422 as they are received. In other embodiments, feedback from viewing users is collected and used to form a new labelled set. Once the new labelled set has reached a threshold size (e.g., a threshold amount of feedback records), the classification model 422 may be trained using the new labelled set.

Process Flow

Figure 6:
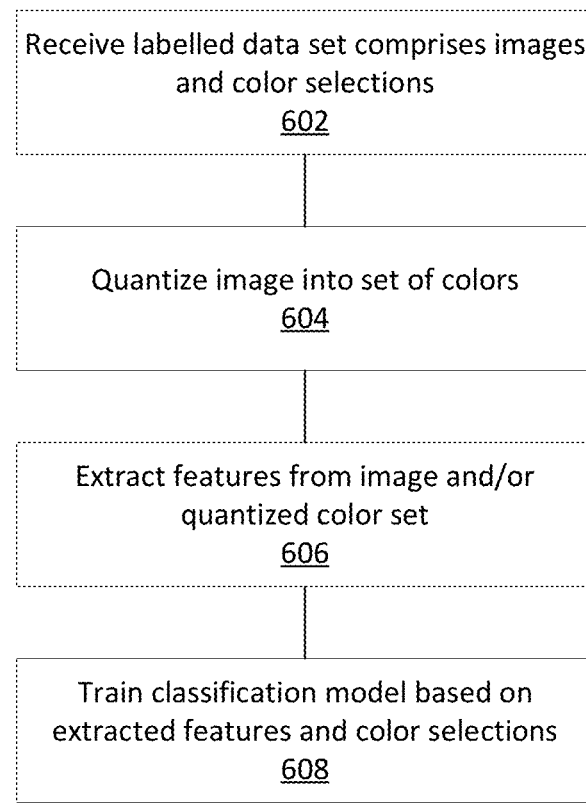
FIG. 6 is a flowchart of a process for generating and training a model for selecting accent colors for content items, in accordance with some embodiments.

FIG. 6 is a flowchart of a process for generating and training a model for selecting accent colors for content items, in accordance with some embodiments. In some embodiments, the process illustrated in FIG. 6 is performed by an image processor of an online system (e.g., the image processor 230 of the online system 140 as illustrated in FIG. 2), although in other embodiments, steps of the process may be performed by other components.

The image processor receives 602 a labelled set for training. The labelled set comprises a plurality of input images and labels indicating colors selected as accent colors for those images. In addition, the labelled set may comprise context features for each of the input images, allowing for the training to take into account different contexts when selecting accent colors.

The image processor quantizes 604 each of the received input images of the labelled set to a set of colors. For example, in some embodiments, each input image is quantized to form a set of 64 colors.

The image processor extracts 606 features of each input image based upon the quantized color set. The features may comprise characteristics or attributes corresponding to each color of the quantized color set (e.g., color component values, coverage in quantized input image, etc.). In addition, the color selection model may further process each input image using an embeddings model to generating embeddings corresponding to descriptive data of the input image.

The image processor trains 606 a machine-learning model uses the extracted features and embeddings. The machine-learning model uses the extracted features and embeddings to select an accent color for each input image, which are compared with the color selections of the labelled set. The machine-learning model then updates its network characteristics based upon the comparison results.

Figure 7:
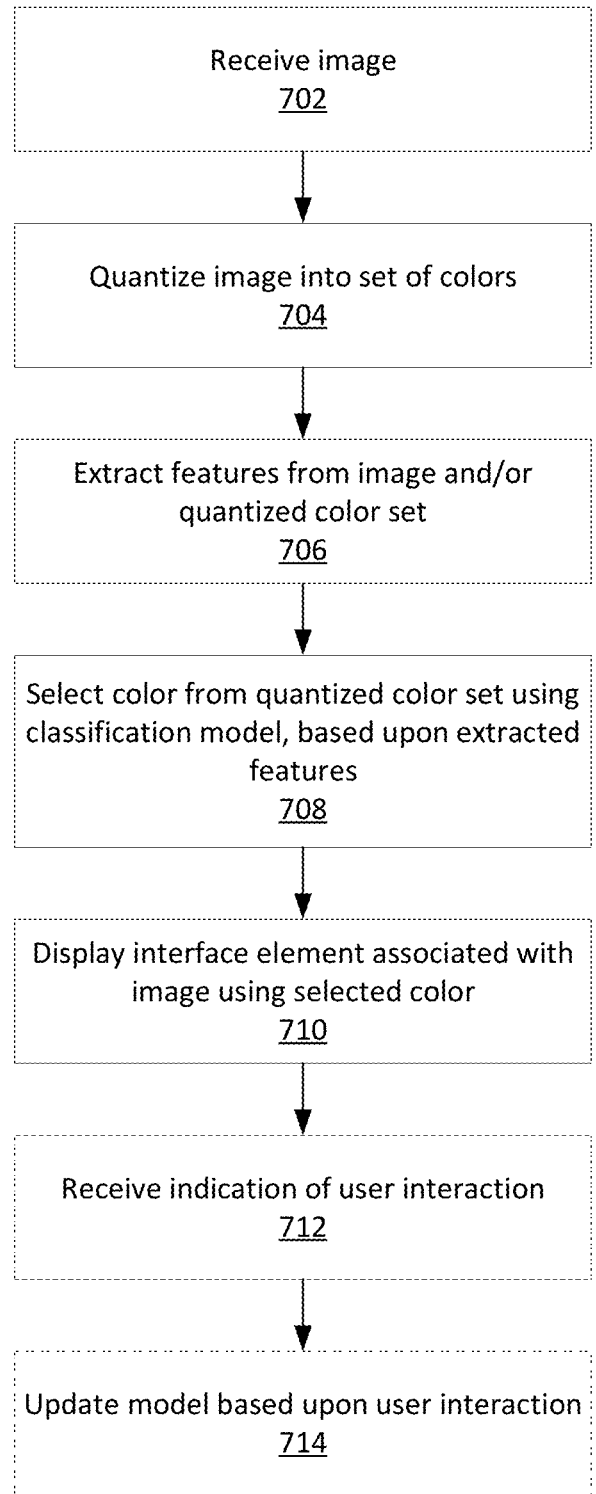
FIG. 7 is a flowchart of a process for using a machine-learning model to automatically select an accent color for a content item to be displayed to a user, in accordance with some embodiments.

FIG. 7 is a flowchart of a process for using a machine-learning model to automatically select an accent color for a content item to be displayed to a user, in accordance with some embodiments.

The image processor receives 702 an input image corresponding to a content item to be displayed. In some embodiments, the image processor receives an indication of the content item, and identifies or extracts an image associated with the content item. In some embodiments, the image processor may further received one or more context features indicating how the content item will be displayed.

The image processor quantizes 704 the received input image to a set of colors. The set of colors may comprise a predetermined number of colors (e.g., 64 colors).

The image processor extracts 706 features from the input image, quantized input image, and quantized color set. For example, the image processor may determine a set of features corresponding to attributes of each color of the quantized color set (e.g., coverage within the quantized input image, component values of the color, etc.). In addition, the image processor may use an embeddings model to extract embeddings associated with the input image.

The image processor uses a classification model to select 708 an accent color from the quantized color set to be associated with the input image, based upon the extracted features (e.g., features associated with the quantized color set, embeddings of the image, context features, etc.). In some embodiments, the machine-trained model is a binary classifier that selects a single color from the quantized color set. In other embodiments, the machine-trained model is a regression model that determines a score for each of a plurality of colors of the quantized color set, and selects a color having a highest score.

The online system displays 710 the content item to a user, the displayed content item comprising at least the input image and an interface element associated with the image using the selected accent color. In some embodiments, the interface element may be of a solid color, or be colored using a gradient based upon the accent color. In some embodiments, in order catch the attention of the user, the interface element may switch between the accent color and another color (e.g., a default color or a second selected accent color), based upon an input by the viewing user (e.g., the user moving a cursor over the interface element) or after a predetermined period of time.

In some embodiments, the online system may optionally receive 712 an indication of a user interaction. For example, if the viewing user is a designer, the user may, via a user interface, indicate whether the selected accent color is suitable for the content item. In addition, if the user indicates that the selected accent color is not suitable, the user may be prompted to indicate a different accent color (e.g., from the quantized set of colors corresponding to the input image) that user regards as suitable. The online system may update 714 the model based upon the received user interaction.

Therefore, by training a model using machine learning techniques, the image processor is able to automatically select accent colors for content items having associated images, in a flexible manner able to take into account the context of the image and the context in which the content item is to be displayed. In addition, as content items are displayed, the model may receive feedback from certain user indicating the quality of the selected accent colors, allowing for the model to be updated (periodically or in real time) to be able to select more suitable accent colors for received input images.

Figure 8:
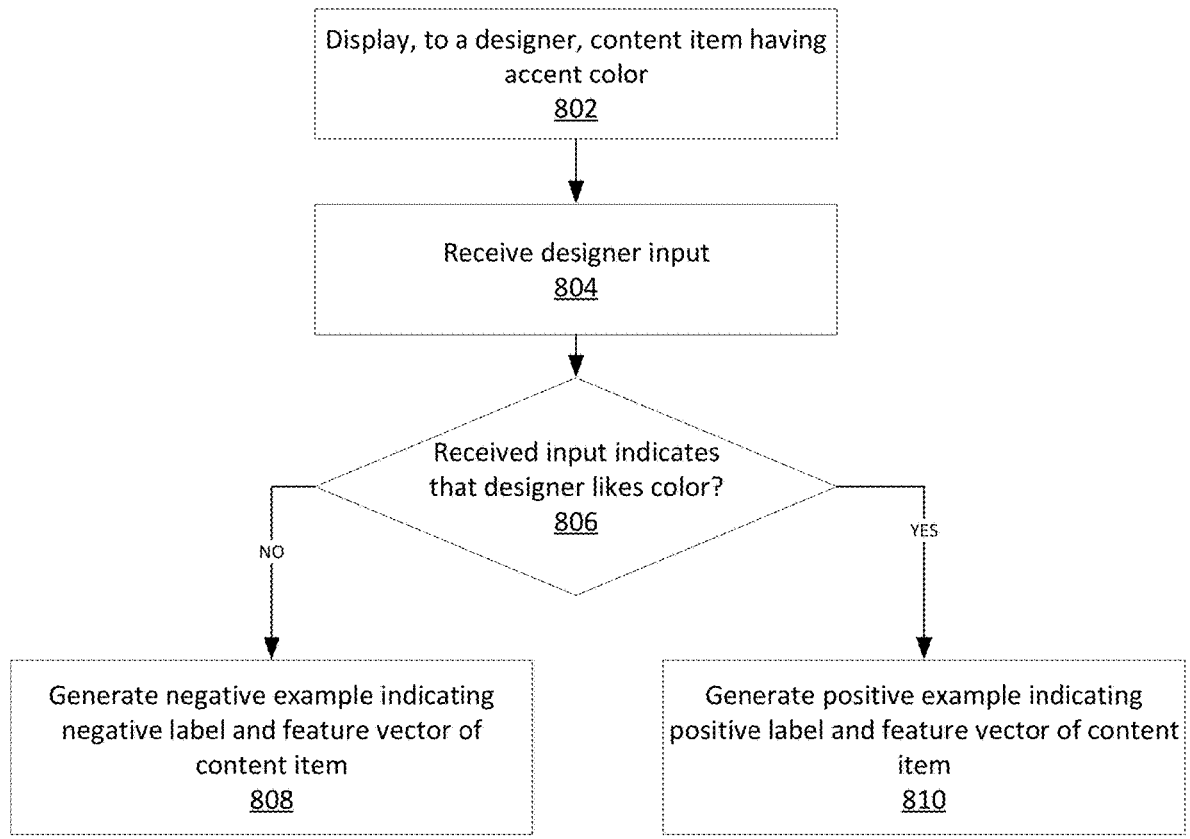
FIG. 8 is a flowchart of a process for generating feedback for accent colors selected for content items, in accordance with some embodiments.

FIG. 8 is a flowchart of a process for generating feedback for accent colors selected for content items, in accordance with some embodiments.

The online system displays 802, to a user, a content item, where the displayed content item is displayed with an accent color selected by an image processor using a trained classification model. The user may correspond to a designer (e.g., as determined based upon login or authentication information).

The online system receives 804 an input from the designer indicating whether the designer likes the accent color displayed in conjunction with the content item or not. In some embodiments, the content item is displayed with one or more user interface elements usable by the designer to indicate their opinion of the selected accent color (e.g., a drop-down menu, thumbs up or thumbs down buttons, etc.). In other embodiments, the designer may indicate their input via a separate tool or interface.

The online system determines 806 whether the input for the designer indicated that the designer liked the selected accent color. If not, the online system generates 708 a negative example for a training data set. The negative example includes at least a negative label indicating that the designer did not like the accent color that was selected for the content item, and a feature vector corresponding to the content item when the accent color for the content item was selected. As discussed above, the feature vector for the content item may comprise color features, image embeddings, and context features associated with the content item.

On the other hand, if the received input indicated that the designer liked the selected accent color, the online system generates 810 a positive example for the training data set. The positive example includes at least a positive label indicating that the designer liked the accent color that was selected for the content item, and the feature vector corresponding to the content item.

In some embodiments, if the designer indicated a dislike of the selected accent color, the designer may be presented with a user interface where the designer can select an accent color that they like from a possible color set corresponding to the input image of the content item. As such, instead of being a negative example, the generated example can be a positive example for the selected color.

As additional inputs are received from designers viewing different content items, additional examples are generated from the training data set, which can be used to train the classification model. The classification model can be trained using the training data set periodically, after the examples of the training data set reaches a threshold number, or some combination thereof. As such, the classification model can be updated based upon feedback received from designers viewing displayed content items and accent colors.

ALTERNATIVE EMBODIMENTS

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  receiving, at an online system, a content item to be provided to a user of the online system;
  identifying an image associated with the content item, wherein the content item is to be displayed with an interface element in proximity to the image;
  selecting a color to be used in displaying the interface element, by:
    quantizing the image into a quantized image associated with a quantized set of colors;
    for each of a plurality of colors of the quantized set of colors, extracting one or more color features based upon the color, the one or more features comprising at least an indication of an amount of coverage of the color within the quantized image, and at least one component value of the color;
    using a neural network model, generating at least one embedding associated with the image, the at least one embedding indicating at least one object depicted in the image;
    using a machine-trained classification model, selecting the color to be used in displaying the interface element from the quantized set of colors, based upon the one or more color features of the plurality of colors and the at least one embedding associated with the image;
  providing the content item for display to the user of the online system, wherein the displayed content item includes at least the image associated with the content item and the interface element displayed in proximity to the image, the interface element displayed in the selected color determined by the machine-trained classification model.

2. The method of claim 1, further comprising:
  receiving, at the machine-trained classification model, one or more context features indicating a manner in which the content item is to be displayed;
  wherein the machine-trained classification model selects the color to be used in displaying the interface element from the quantized set of colors, based further upon the one or more received context features.

3. The method of claim 2, wherein the one or more context features indicate at least one of: a type of the interface element, a type of the content item, and at least one characteristic of an interface of the online system on which the content item is to be displayed to the user.

4. The method of claim 1, wherein the one or more color features corresponding to a color of the plurality of colors comprises at least one of: a hue of the color, a saturation of the color, and a color component of the color.

5. The method of claim 1, further comprising:
  receiving, via an interface provided by the online system, an interaction from the user provided with the displayed content item, the interaction comprising an indication of whether the selected color for the interface element is believed suitable by the user; and
  updating the machine-trained classification model based upon the indication.

6. The method of claim 1, further comprising training the machine-trained classification model by:
  providing the machine-trained classification model with a labelled set comprising at least a plurality of images and a plurality of labels, each label corresponding to an image of the plurality of images and indicating a color selected for use in displaying an interface element in proximity to the image;
  for each image of the plurality of images, using the machine-trained classification model to select a color for the image from a quantized set of colors based upon the image, the selection based upon one or more color features associated with the quantized set of colors and the at least one embedding associated with the image;
  for each image, comparing the color selected by the machine-trained classification model with the color indicated by the label corresponding to the image; and updating the machine-trained classification model based upon the comparison.

7. The method of claim 1, further comprising:
determining a complementary color set, each color of the complementary color set corresponding to a complement of a color of the quantized set of colors;
wherein the machine-trained classification model selects the color to be used in displaying the interface element from the complementary color set.

8. A non-transitory computer readable storage medium storing computer program instructions, the computer program instructions when executed by a computer processor causes the processor to perform the steps of:
receiving, at an online system, a content item to be provided to a user of the online system;
identifying an image associated with the content item;
determining that the content item is to be displayed with an interface element in proximity to the image;
selecting a color to be used in displaying the interface element, by:
quantizing the image into a quantized image associated with a quantized set of colors;
for each of a plurality of colors of the quantized set of colors, extracting one or more color features based upon the color, the one or more features comprising at least an indication of an amount of coverage of the color within the quantized image, and at least one component value of the color;
using a neural network model, generating at least one embedding associated with the image, the at least one embedding indicating at least one object depicted in the image;
using a machine-trained classification model, selecting the color to be used in displaying the interface element from the quantized set of colors, based upon the one or more color features of the plurality of colors and the at least one embedding associated with the image;
providing the content item for display to the user of the online system, wherein the displayed content item includes at least the image associated with the content item and the interface element displayed in proximity to the image, the interface element displayed in the selected color determined by the machine-trained classification model.

9. The computer readable storage medium of claim 8, wherein the computer program instructions when executed by a computer processor further cause the processor to:
receiving, at the machine-trained classification model, one or more context features indicating a manner in which the content item is to be displayed;
wherein the machine-trained classification model selects the color to be used in displaying the interface element from the quantized set of colors, based further upon the one or more received context features.

10. The computer readable storage medium of claim 9, wherein the one or more context features indicate at least one of: a type of the interface element, a type of the content item, and at least one characteristic of an interface of the online system on which the content item is to be displayed to the user.

11. The computer readable storage medium of claim 8, wherein the one or more color features corresponding to a color of the plurality of colors comprises at least one of: a hue of the color, a saturation of the color, and a color component of the color.

12. The computer readable storage medium of claim 8, wherein the computer program instructions when executed by a computer processor further cause the processor to:
receiving, via an interface provided by the online system, an interaction from the user provided with the displayed content item, the interaction comprising an indication of whether the selected color for the interface element is believed suitable by the user; and
updating the machine-trained classification model based upon the indication.

13. The computer readable storage medium of claim 8, wherein the computer program instructions when executed by a computer processor further cause the processor to train the machine-trained classification model by:
providing the machine-trained classification model with a labelled set comprising at least a plurality of images and a plurality of labels, each label corresponding to an image of the plurality of images and indicating a color selected for use in displaying an interface element in proximity to the image;
for each image of the plurality of images, using the machine-trained classification model to select a color for the image from a quantized set of colors based upon the image, the selection based upon one or more color features associated with the quantized set of colors and the at least one embedding associated with the image;
for each image, comparing the color selected by the machine-trained classification model with the color indicated by the label corresponding to the image; and
updating the machine-trained classification model based upon the comparison.

14. The computer readable storage medium of claim 8, wherein the computer program instructions when executed by a computer processor further cause the processor to:
determining a complementary color set, each color of the complementary color set corresponding to a complement of a color of the quantized set of colors;
wherein the machine-trained classification model selects the color to be used in displaying the interface element from the complementary color set.

15. An online system, comprising:
a receiver configured to receive a content item to be provided to a user of the online system, the content item including an image;
at least one processor configured to:
receive a content item to be provided to a user of the online system;
identify an image associated with the content item;
determine that the content item is to be displayed with an interface element in proximity to the image;
select a color to be used in displaying the interface element, by:
quantizing the image into a quantized image associated with a quantized set of colors;
for each of a plurality of colors of the quantized set of colors, extracting one or more color features based upon the color, the one or more features comprising at least an indication of an amount of coverage of the color within the quantized image, and at least one component value of the color;
using a neural network model, generating at least one embedding associated with the image, the at least one embedding indicating at least one object depicted in the image;
using a machine-trained classification model, selecting the color to be used in displaying the interface element from the quantized set of colors, based upon the one or more color features of the plurality of colors and the at least one embedding associated with the image;

provide the content item for display to the user of the online system, wherein the displayed content item includes at least the image associated with the content item and the interface element displayed in proximity to the image, the interface element displayed in the selected color determined by the machine-trained classification model.

16. The online system of claim 15, wherein the processor is further configured to:

receive, at the machine-trained classification model, one or more context features indicating a manner in which the content item is to be displayed;

wherein the machine-trained classification model selects the color to be used in displaying the interface element from the quantized set of colors, based further upon the one or more received context features.

17. The online system of claim 15, wherein the one or more color features corresponding to a color of the plurality of colors comprises at least one of: a hue of the color, a saturation of the color, and a color component of the color.

18. The online system of claim 15, wherein the processor is further configured to:

receive, via an interface provided by the online system, an interaction from the user provided with the displayed content item, the interaction comprising an indication of whether the selected color for the interface element is believed suitable by the user; and update the machine-trained classification model based upon the indication.

19. The online system of claim 15, wherein the processor is further configured to train the machine-trained classification model by:

providing the machine-trained classification model with a labelled set comprising at least a plurality of images and a plurality of labels, each label corresponding to an image of the plurality of images and indicating a color selected for use in displaying an interface element in proximity to the image;

for each image of the plurality of images, using the machine-trained classification model to select a color for the image from a quantized set of colors based upon the image, the selection based upon one or more color features associated with the quantized set of colors and the at least one embedding associated with the image;

for each image, comparing the color selected by the machine-trained classification model with the color indicated by the label corresponding to the image; and updating the machine-trained classification model based upon the comparison.

20. The online system of claim 15, wherein the processor is further configured to:

determine a complementary color set, each color of the complementary color set corresponding to a complement of a color of the quantized set of colors;

wherein the machine-trained classification model selects the color to be used in displaying the interface element from the complementary color set.

* * * * *